United States Patent [19]

Hahn et al.

[11] Patent Number: 5,188,680
[45] Date of Patent: Feb. 23, 1993

[54] METHOD OF MAKING TOOTH POINT

[75] Inventors: Frederick C. Hahn, Aloha; Andrew H. Ulven, Silverton; James W. Huiras, Canby, all of Oreg.

[73] Assignee: ESCO Corporation, Portland, Oreg.

[21] Appl. No.: 614,253

[22] Filed: Nov. 15, 1990

[51] Int. Cl.⁵ .......................... C21D 8/00; C21D 8/10
[52] U.S. Cl. .................... 148/593; 148/594; 148/654; 72/324; 72/370; 76/101.1; 76/109; 29/400.1; 29/891; 37/142 R
[58] Field of Search ............ 37/142 R; 29/400.1, 29/891; 76/101.1, 109; 72/324, 370; 148/12.4, 12 B, 593, 594, 654

[56] References Cited

U.S. PATENT DOCUMENTS 4,577,423 3/1986 Hahn .................... 37/142 R

OTHER PUBLICATIONS

Roads and Streets, Sep., 1958.

Primary Examiner—Upendra Roy
Assistant Examiner—Sikyin Ip
Attorney, Agent, or Firm—Banner, Birch, McKie & Beckett

[57] ABSTRACT

A method of making a tooth point and product wherein a tubular blank of alloy steel is heated, shaped at one end to provide a box section and shaped at the other end to provide a blade made up of two layers of steel forged together.

30 Claims, 3 Drawing Sheets

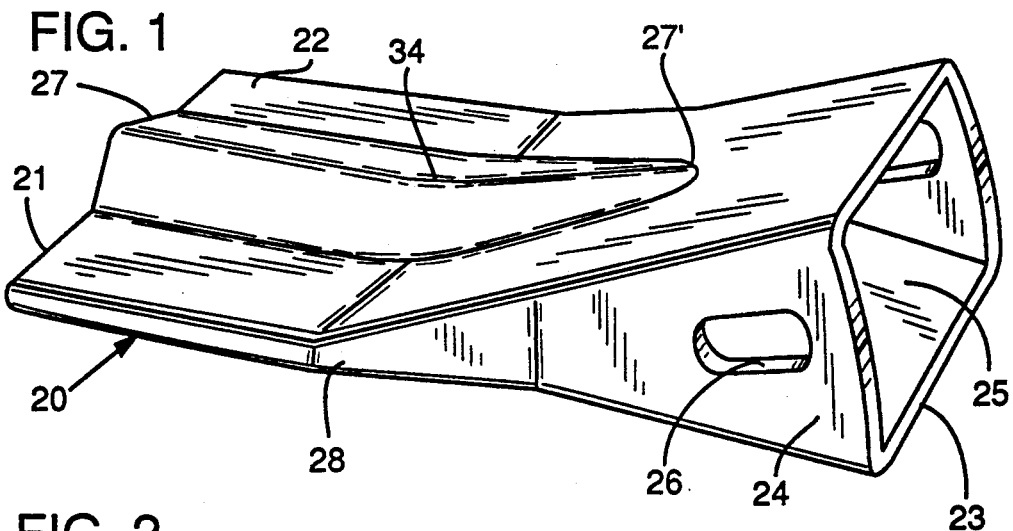
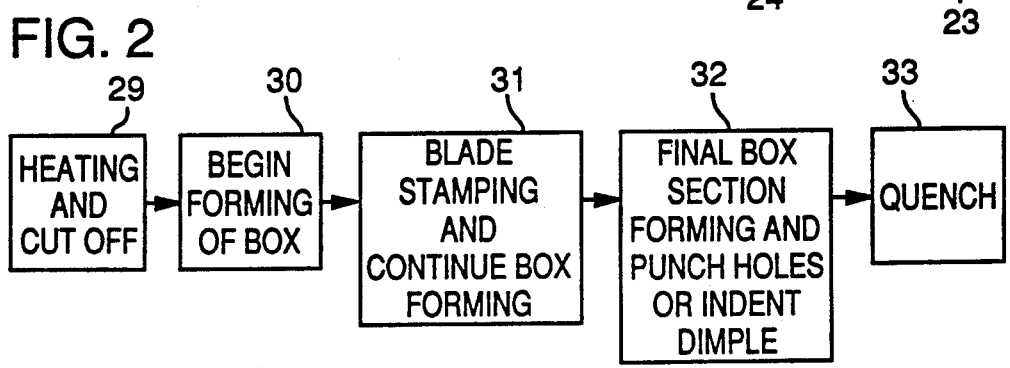
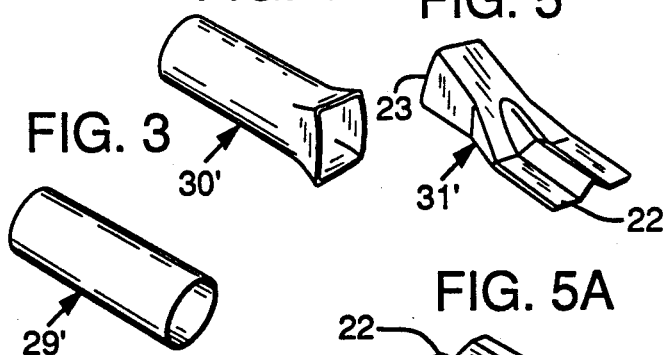
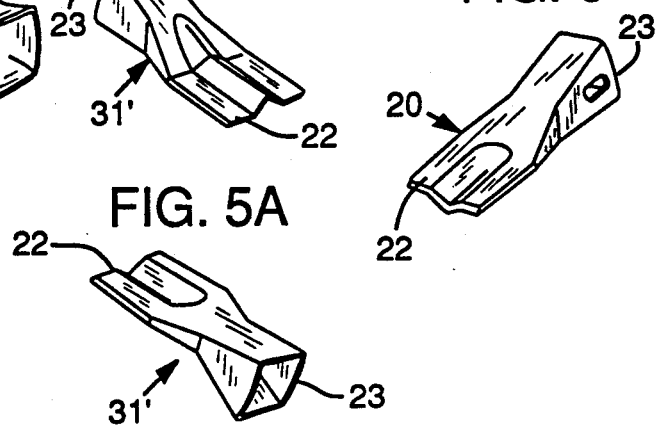

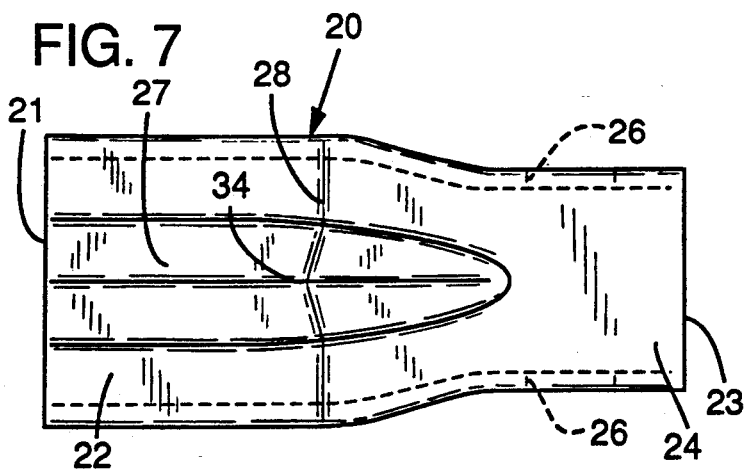
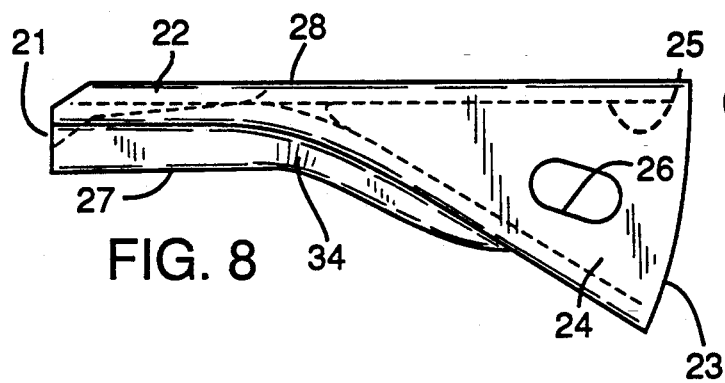
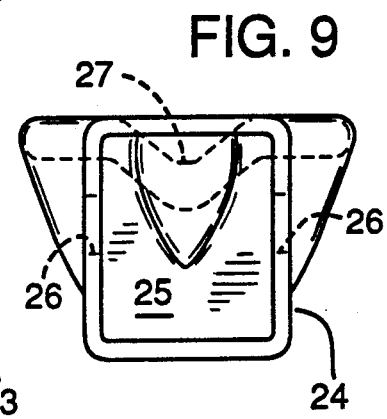
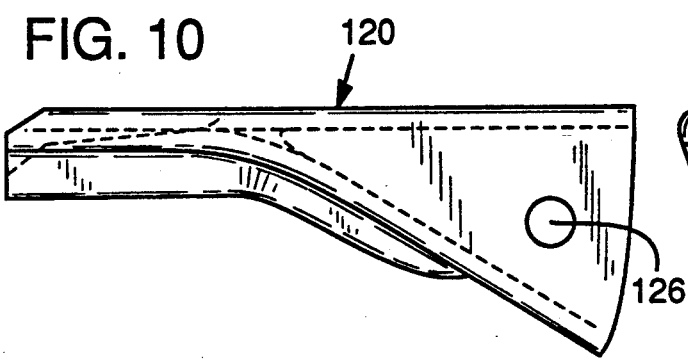
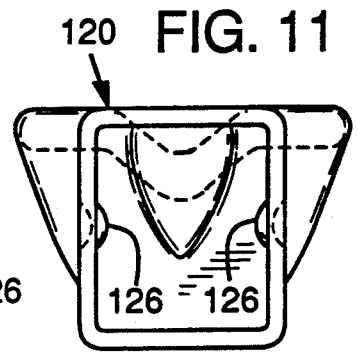

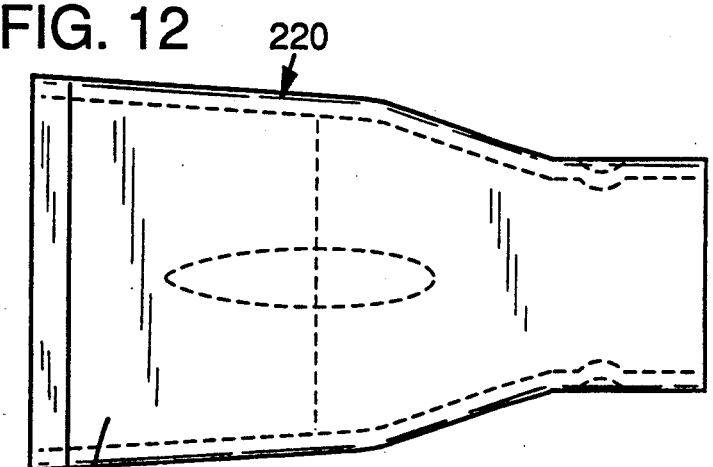
FIG. 12
FIG. 13
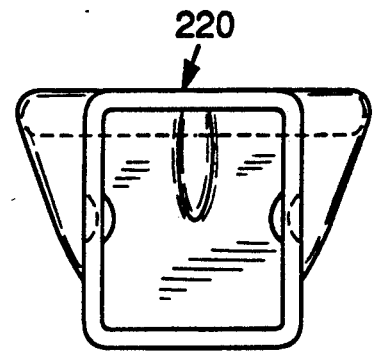
FIG. 14
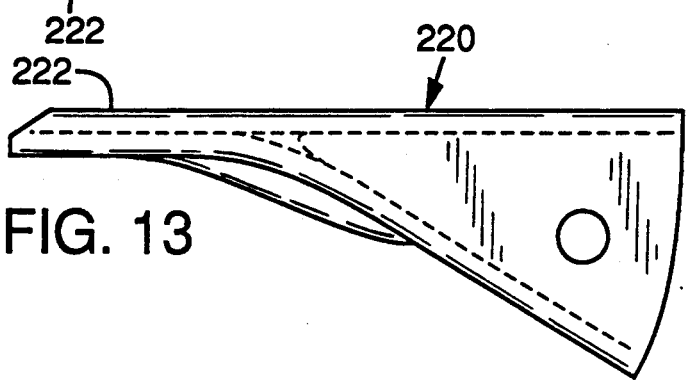
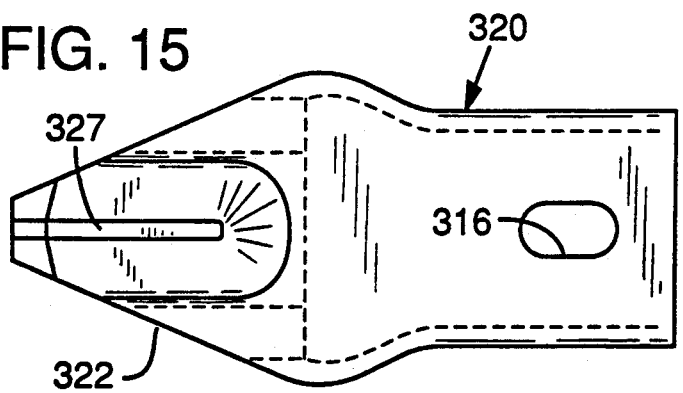
FIG. 15
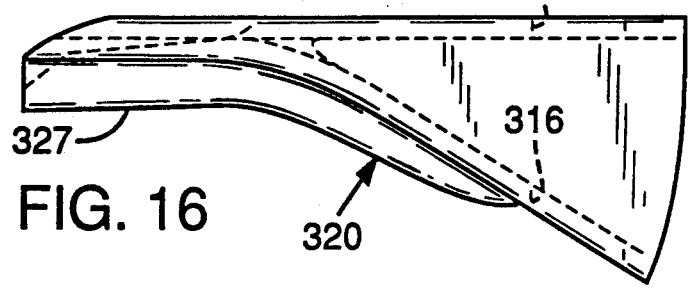
FIG. 16
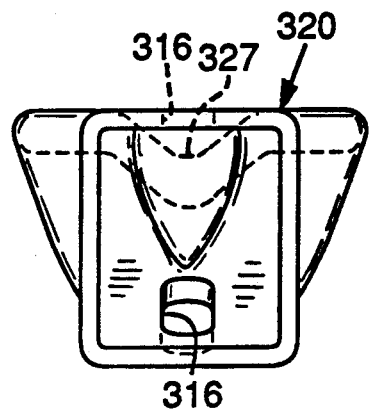
FIG. 17

METHOD OF MAKING TOOTH POINT

BACKGROUND AND SUMMARY OF INVENTION

This invention relates to a method of making a tooth point and product and, more particularly, to a unitary member made by shaping a steel tube.

There has been continued emphasis over the years in making small tooth points at low cost. The tooth points are generally wedge shaped having a forward penetrating edge or bit and a box section providing an adapter nose-receiving socket extending from the rear end. It is not unusual for a given supporting adapter to have the points or tips replaced between 5 and 25 times during the adapter life—hence the drive for economy. This is particularly so with small teeth such as are employed on small back hoes and front end loaders.

According to the invention, we start with a steel tube and subject it first to cutoff to required length from random length raw material and a heating operation to bring the temperature up to about the upper critical level which is that normally employed in hot forging. Thereafter, the tube is shaped at one end by being subjected to dies to start forming the box section of the point. Thirdly, stamping dies are applied to the other end to develop the point bit or blade which in combination with oppositely disposed dies further develops the socket or box section of the point. Fourth, the box section is completed and this includes piercing the box section to form lock holes or indenting the box section to provide locking dimples. Fifth, the resulting point is quenched typically in water but in any quenching means depending upon the raw material used.

This results in a novel point which includes a unitary steel element having a blade section at one end, a box section at the other end with the blade section being constructed of two layers of steel forged together from opposed portions of the originating tubular blank.

The inventive process and construction is superior to the simple procedure of welding a C-section to a plate in that it provides a stronger point. Although forging of solid blocks of steel has been employed for the development of tooth points, the instant invention provides a significant advantage in eliminating several die operations and the wear on the die resulting therefrom.

Other objects and advantages of the invention may be seen in the details of the ensuing specification.

BRIEF DESCRIPTION OF DRAWING

The invention is described in conjunction with an illustrative embodiment in the accompanying drawing, in which—FIG. 1 is a perspective view of a tooth point produced according to the teachings of this invention;

FIG. 2 is a schematic diagram showing the steps of operation of the inventive method;

FIG. 3 is a perspective view of the starting structure, i.e., a tube which is subjected to heating;

FIG. 4 is a perspective view of the partially formed point as would result from the initial box forming of the second stage of FIG. 2;

FIGS. 5 and 5A are opposed/side perspective views of the partially formed blank resulting from the third stage of FIG. 2;

FIG. 6 is a perspective view of the point resulting from the fourth stage of FIG. 2;

FIGS. 7, 8 and 9 are, respectively, top, side and end elevational views of the tooth point seen in FIG. 1;

FIGS. 10 and 11 are, respectively, side and end views of a modified form of point featuring dimples for the means for locking the point to an adapter rather than the openings of FIGS. 1 and 7-9;

FIGS. 12-14 are, respectively, top, side and end elevational views of a modified form of point showing a "flared" tip; and FIGS. 15-17 are, respectively, top, side and end elevational views of a further modified form of tooth point featuring a "pick" tip and top and bottom openings for the means for locking the point to an adapter.

DETAILED DESCRIPTION

In the illustration given and with reference first to FIG. 1, the numeral 20 designates generally a tooth point constructed according to the teachings of this invention. The point is relatively elongated and at its forward end 21 is equipped with a penetrating edge developed by a blade section 22. At its rear end 23 is a box section 24 of generally rectangular configuration which provides a forwardly extending tapered socket 25 for ensleeving over an adapter (not shown). The box section 24 is equipped with horizontally aligned openings one of which is shown at 26 for the receipt of a locking pin (not shown) which extends through an aligned pin opening in the adapter.

The preferred embodiment also includes a strengthening rib 27 which extends substantially the length of the blade portion 22 past the transition portion 28 between the box section 24 and the blade section 22 ending in the box at 27'. Additional details of the point of FIG. 1 can be seen in FIGS. 7-9. For example, the box section 24 is formed by top and bottom walls extending at an angle of about 30° to each other.

The method aspect of the invention will now be described in conjunction with FIGS. 2-6. Reference to FIG. 2 shows a sequence of boxes schematically representing heating as at 29, the beginning of box forming at 30, blade stamping and the continuation of box forming at 31, the final box forming and punching at 32, and quenching as at 33.

Heating

To commence the development of the inventive tooth point, we start with a tube 29' (see FIG. 3) of alloy steel. This may be circular in cross-section as shown or may be square or rectangular although the shapes other than circular are somewhat higher in cost. These alternative shapes, however, may provide economies in processing to offset the initial cost. The tube 29' is subjected to heating to a temperature of the order of about 1900° F. This is the temperature normally employed in hot forging and is designated as the upper critical temperature. Thereafter, the heated tube is moved to a press, i.e., a shaping station wherein the steps of and box section and blade forming are performed. As an example, advantageous results are obtained with tubes having wall thicknesses of the order of about 3/16" to about ¼" but it can be appreciated larger wall thicknesses could be used successfully.

Beginning of Box Section Forming

The initial shaping is stated at the end which ultimately provides the box section, the tubular blank 29' of FIG. 3 being converted to the partially formed blank 30' of FIG. 4.

Continuation of Box Section Forming and Blade Stamping

At the press, forging dies are provided that come together to flatten one end of the blank 31' as at 22 in FIGS. 5 and 5A.

Preferably in this step we provide the dies with mating tongue and groove shapes so as to develop the stiffening rib 27 which extends substantially along the blade 22 but terminates at 27' and so does not interfere with the socket 25. At about the same time the die that forms the box as a continuation of step 30 also forms a continuation stiffening rib terminating in the box at 27'.

Thereafter and preferably while the partially formed blank generally is still maintained between the stamping dies of the press, we finalize the box section forming.

Final Box Section Forming

As indicated, while the blank 31' is still maintained in position in the press, and a forming die is maintained at the open end of the blank at 25, and jaw dies bear against the exterior of the blank to form the transition from the box 24 and the blade 22, we punch the lock means such as the openings 26. These jaw dies are equipped with punch means so as to simultaneously develop the pin receiving openings 26 or dimple 126 in the case of point 120.

In the event a square tube of proper cross-section for the box section is utilized the transition shaping is still required and the box section is subjected to either a punching or indenting operation to provide the means for locking the point to an adapter.

Such dimpling or indentations are shown in the variation of the point at 120 as seen in FIGS. 10 and 11. Instead of having the slot-like openings 26, dimples or detents as at 126 are provided in the sidewalls somewhat analogous to those shown in U.S. Pat. No. 4,577,423. Reference is hereby made to that patent for additional details of tooth construction, particularly the general form of the adapter not shown herein.

The configuration of point shown in FIGS. 1 and 7-11 is considered a "standard" point as contrasted to the flared point 220 seen in FIGS. 12-14. This has a relatively wider blade section 222 (see FIG. 12) as compared with the blade shape 22 of FIG. 7. In some instances, we omit the blade stiffening rib from the flared point as is the case in the showing of FIGS. 12-14.

Yet other modifications are available within the scope of the invention and for this purpose reference is made to FIGS. 15-17 which illustrate a "pick" point generally designated 320. Here the blade section 322 is forwardly tapered (see FIG. 15) and optionally may be equipped with a rib 327.

A further modification is seen in the embodiment of FIGS. 15-17 wherein the lock receiving openings are provided in the top and bottom walls as at 316.

Quench

The fifth step involves quenching the end product by injecting it into a quenching media such as but not limited to cold agitated water immediately after the last forming step, thus saving the cost of reheating the part after it is cold and then performing the quench phase like is normally done for forgings and castings. This is done for forgings and castings because one cannot perform finishing work on the parts by hand when they are red hot but here we can eject the part right out of the machine and into the agitated cold water and perform the martensite formation heat treatment, which provides hardness for wear resistance and toughness for strength.

Subsequent to this, the part is typically taken into a tempering oven and held for 2-4 hours at 400° F., followed by an air cool. This is a stress relieving process that is aimed primarily at eliminating white martensite, which is a brittle form of martensite. Typically the manufacturing time for steps 30 through 33 is in the range of 1½ to 2 seconds, therefore considerably less than any conventional forming means.

Through the practice of the invention, a tooth point is achieved with great economy and strength. The blade portion includes two layers of steel forged together from opposed portions of the tubular blank (round or rectangular, etc.). Laboratory wear and impact and field tests demonstrate that points made according to the invention have strengths equal to or superior to those produced by other forging casting, or fabrication means and at substantially less cost. The stiffening provides rib 27 adds strength to resist bending and fatigue loads at no increase in weight.

The invention is characterized by both advantageous strength and economy in manufacture. In part, this results from the use of a tube as a starting material and also from the ability to perform only two shaping operations and these both at the same station whereby the blank is maintained hot and the dies subjected to minimal wear per operation.

While in the foregoing specification a detailed description of an embodiment of the invention has been set down for the purpose of illustration, many variations in the details hereingiven may be made by those skilled in the art without departing from the spirit and scope of the invention.

We claim:

1. A method of manufacturing an excavating tooth point comprising:
   heating a relatively elongated tube of steel having a pair of ends to about its upper critical temperature,
   inserting a forming die into one tube end,
   applying jaw dies radially thereof to said one tube end to start forming a rectangular configuration constituting a point box section,
   die-shaping the other end of said tube to a blade configuration,
   shaping the box section to final configuration, and
   quenching the tube after it has been formed into a tooth point shape.

2. The method of claim 1 in which said applied jaw dies are equipped with punch means, and wherein the method further includes punching said rectangular configuration during final forming to provide the tooth point with a locking structure.

3. The method of claim 2 in which said insertion of the forming die and said application of the jaw dies forms sides of the point box section as wall portions extending generally perpendicular to said blade configuration, and in which said punching step includes punching said wall portions of said rectangular configuration.

4. The method of claim 3 in which said punching step includes punching openings to extend through said sides.

5. The method of claim 3 in which said punching step includes punching dimples in said sides.

6. The method of claim 2 in which said insertion of the forming die and said application of said jaw dies form top and bottom walls of the point box section as wall portions extending generally parallel to said blade configuration, and in which said punching step includes punching the top and bottom walls of said rectangular configuration.

7. The method of claim 1 in which said die shaping is performed by closing dies, said dies being equipped with axially extending tongue and groove portions, the method further including forming a stiffening rib in said point blade and box section with the tongue and groove portions.

8. The method of claim 7 in which said rib forming step includes forming said rib generally in said blade configuration.

9. The method of claim 1 in which the formed tooth points are tempered for about 2 to 4 hours at about 400° F. and are thereafter subjected to air cooling.

10. The method of claim 1 in which said heating step includes heating a relatively elongated tube of steel having a generally rectangular cross sectional shape.

11. The method of claim 10 in which said heating step includes heating a tube having a generally square cross sectional shape.

12. The method of claim 1 in which said heating step includes heating a tube having a generally circular cross sectional shape.

13. A method of fabricating an excavating tooth point comprising heating a tube having a pair of ends, pressing one end of the heated tube so that opposing side walls of the tube are flattened toward one another to form a blade portion having a double layer of material on one end of the tube, die forming the other end of the tube so that a tubular configuration is provided on the other end of the tube to facilitate mounting of the tooth point on an adapter, and hardening the tube after the tube has been formed into a tooth point shape.

14. The method of claim 13 wherein said die forming of the tube further comprises forming said other end of the tube to have a rectangular cross sectional configuration to thereby define a box end mounting section.

15. The method of claim 14 wherein said pressing of said tube further includes the formation of at least one rib in at least the flattened blade portion.

16. The method of claim 15 wherein said forming of the rib includes forming a generally V-shaped groove longitudinally along a central portion of the blade portion.

17. The method of claim 13 wherein said pressing of said tube further includes the formation of at least one rib in at least the blade portion.

18. The method of claim 13 wherein said pressing of said tube includes forming the blade portion to have a width which narrows toward said one end.

19. The method of claim 13 wherein said pressing of said tube includes forming the blade portion to have a wider configuration than the tubular end.

20. The method of claim 13, further comprising forming a retention structure in the tubular end of the tube to facilitate mounting of the tooth point to an adaptor.

21. The method of claim 20 wherein said forming of said retention structure includes punching openings in opposing sidewalls of the tubular end.

22. The method claim 20 wherein said forming of said retention structure includes forming depressions in opposing sidewalls of the tubular end.

23. The method of claim 13 wherein said hardening of the tube includes quenching the tube formed into the tooth point shape.

24. A method of fabricating an excavating tooth point comprising:
    providing a tube having a pair of ends;
    heating the tube so that the tube is softened;
    die forming one end of the tube into a certain tubular configuration adapted for mounting on an adapter;
    pressing the other end of the tube so that opposing sides of the tube are pressed toward each other to define a blade portion;
    forming on said one end of the tube a structure by which the formed tooth point is secured to an adapter; and
    hardening the tube formed into a tooth point shape.

25. The method of claim 24 wherein said pressing of said other end of the tube includes forming a stiffening rib in at least the sides of the tube pressed toward one another.

26. The method of claim 25 wherein said forming of the stiffening rib includes forming a generally V-shaped groove longitudinally along a central portion of the tube.

27. The method of claim 24 wherein said die forming of said one end of the tube further includes the formation of said one end into a rectangular box end section.

28. The method of claim 24 wherein said forming of said structure for securing the tooth point to an adapter includes the formation of openings in opposing side walls of said one end of said tube.

29. The method of claim 24 wherein said forming of said structure for securing the tooth point to an adapter includes the formation of recesses in opposing side walls of said one end of said tube.

30. The method of claim 24 wherein said hardening of said tooth includes quenching of the tube formed into a tooth point shape.

* * * * *